// United States Patent //

Park et al.

(10) Patent No.: US 8,865,343 B2
(45) Date of Patent: Oct. 21, 2014

(54) PCM ASSEMBLY AND PRISMATIC TYPE SECONDARY BATTERY USING THE SAME

(75) Inventors: Seok-Ryun Park, Suwon-si (KR); Seok Koh, Suwon-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 786 days.

(21) Appl. No.: 12/923,244

(22) Filed: Sep. 10, 2010

(65) Prior Publication Data

US 2011/0097608 A1   Apr. 28, 2011

(30) Foreign Application Priority Data

Oct. 27, 2009   (KR) .................. 10-2009-0102284

(51) Int. Cl.
*H01M 2/04* (2006.01)
*H01M 2/20* (2006.01)
*H01M 2/30* (2006.01)
*H01M 2/02* (2006.01)
*H01M 2/34* (2006.01)

(52) U.S. Cl.
CPC ............. *H01M 2/0207* (2013.01); *H01M 2/34* (2013.01); *Y02E 60/12* (2013.01)
USPC ............... 429/169; 429/7; 429/122; 429/163; 429/178

(58) Field of Classification Search
None
See application file for complete search history.

(56) References Cited

U.S. PATENT DOCUMENTS

| 5,993,990 | A | * | 11/1999 | Kanto et al. ................. 429/62 |
|---|---|---|---|---|
| 2008/0254344 | A1 | | 10/2008 | Wang et al. |
| 2009/0068501 | A1 | | 3/2009 | Hong et al. |
| 2009/0098418 | A1 | | 4/2009 | Byun et al. |
| 2009/0136843 | A1 | * | 5/2009 | Yamamoto et al. ........... 429/179 |
| 2009/0226811 | A1 | * | 9/2009 | Nakaoka ....................... 429/223 |
| 2010/0098973 | A1 | * | 4/2010 | Lee et al. ......................... 429/7 |

FOREIGN PATENT DOCUMENTS

| JP | 09-320643 A | 12/1997 |
|---|---|---|
| JP | 2005-517274 A | 6/2005 |
| KR | 10-2007-0071234 A | 7/2007 |
| KR | 10-2007-0088991 A | 8/2007 |
| KR | 10 2009-0038153 A | 4/2009 |

OTHER PUBLICATIONS

Korean Notice of Allowance in KR 10-2009-0102284, dated Nov. 30, 2011 (Park, et al.).

* cited by examiner

*Primary Examiner* — Kwang Han
(74) *Attorney, Agent, or Firm* — Lee & Morse, P.C.

(57) ABSTRACT

A protection circuit module (PCM) assembly for use with a battery cell includes a base circuit board on which a plurality of electronic elements are mounted, and a first electrode output terminal formed on the base circuit board. The PCM assembly is to be coupled to a top portion of the battery cell and electrically connected to the first electrode lead and the second electrode lead. The first electrode output terminal is to be directly connected to a first terminal of an external device and to be electrically connected to an electrode terminal of the battery cell to form a first output stage. A second electrode lead at a side of the base circuit board is to be directly connected to a second terminal of the external device and is to be connected to the can or the cap plate to form a second output stage.

12 Claims, 4 Drawing Sheets

PCM ASSEMBLY AND PRISMATIC TYPE SECONDARY BATTERY USING THE SAME

BACKGROUND

1. Field

One or more embodiments relate to a prismatic type secondary battery, and more particularly, to a protection circuit module (PCM) assembly having formed therein a reduced number of output stages, and a prismatic type secondary battery using the PCM assembly.

2. Description of the Related Art

Generally, unlike primary batteries, which are incapable of being recharged, secondary batteries may be charged and discharged. Secondary batteries are used for small-size devices such as cellular phones, notebook computers, camcorders, and so forth, or for medium- and large-size devices such as electronic automobiles, electronic bicycles, uninterruptible power supplies (UPSs), and the like.

The secondary batteries may be classified into a can type, which may be further classified into a cylindrical type and a prismatic type, and a pouch type having flexibility, depending on the shape of a casing accommodating a battery unit.

In a conventional prismatic type battery, a plurality of connection leads are separately used to electrically connect a protection circuit module (PCM) assembly to a battery cell where a battery unit including a positive electrode plate, a negative electrode plate, and a separator is disposed. In the PCM assembly are formed a positive output terminal P+ electrically connected to the positive electrode plate, a negative output terminal P− electrically connected to the negative electrode plate, and a resistance output terminal CF for reading an electronic state, e.g., a resistance, of the battery.

In the prismatic type secondary battery structured as described above, after the PCM assembly is connected to the battery cell, a top case made of polymer resin is mounted on an upper portion of the battery cell and a bottom case is mounted on a lower portion of the battery cell. The top case and the bottom case are inserted into a film-form outer case provided separately, and label for detecting water contact is attached to the upper portion of the top case.

In the conventional prismatic type secondary battery, all of the positive output terminal, the negative output terminal, and the resistance output terminal are formed in the PCM assembly, and the positive output terminal and the negative output terminal are electrically connected to the positive electrode plate and the negative electrode plate, respectively. Moreover, the bottom case, the outer case, and the label for detecting water contact are separately required, increasing the number of parts, thus increasing the complexity and cost of a manufacturing process.

SUMMARY

One or more example embodiments include a protection circuit module (PCM) assembly in which a reduced number of output stages are formed, thereby simplifying a manufacturing process, and a prismatic type secondary battery using the PCM assembly.

Additional aspects will be set forth in part in the description which follows and, in part, will be apparent from the description, or may be learned by practice of the example embodiments.

According to one or more embodiments, a prismatic type secondary battery includes a battery cell including a can accommodating a battery unit in which a first electrode plate, a separator, and a second electrode plate are wound, a cap plate sealing an opening of the can; and a first electrode lead and a second electrode lead electrically connected to the first electrode plate and the second electrode plate, respectively, and a PCM assembly coupled to a top portion of the battery cell and electrically connected to the first electrode lead and the second electrode lead. The PCM assembly includes a base circuit board on which a plurality of electronic elements is mounted and a first electrode output terminal formed on the base circuit board. The first electrode lead is connected to a first electrode output terminal which is formed on the PCM assembly and is directly connected to a first terminal of an external device, to form a first output stage. The second electrode lead is directly connected to a second terminal of the external device and is connected to the can or the cap plate, which is to serve as a second electrode output terminal, to form a second output stage.

The first electrode lead may be electrically connected to an electrode terminal which is coupled to the cap plate while being insulating from the cap plate, and the electrode terminal may be electrically connected to the first electrode output terminal.

The second electrode lead may be electrically connected to a bottom surface of the cap plate.

The cap plate may be welded to the can so that the can forms a positive output terminal.

The first electrode lead protruding from the first electrode plate may be connected to a first electrode terminal which is installed on the cap plate while being insulated from the cap plate, and the first electrode terminal may be electrically connected to the first electrode output terminal. The second electrode lead protruding from the second electrode plate may be electrically connected to the can or the cap plate.

The battery cell may be a nickel-cobalt-manganese (Ni—Co—Mn) battery cell or a nickel-cobalt-aluminum (Ni—Co—Al) battery cell.

According to one or more embodiments of the present invention, a protection circuit module (PCM) assembly to be electrically connected to a battery cell for a secondary battery includes a base circuit board, a plurality of electronic elements mounted on the base circuit board, and a first electrode output terminal on the base circuit board. The first electrode output terminal is to be directly connected to a first terminal of an external device and is to be electrically connected to an electrode terminal of the battery cell to form a first output stage.

The electronic elements may include a positive temperature coefficient (PTC) element, and the PTC element may be electrically connected between the first electrode output terminal and the electrode terminal.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2009-0102284, filed on Oct. 27, 2009, in the Korean Intellectual Property Office, and entitled: "PCM Assembly and Prismatic Type Secondary Battery Using the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

Figure 1:
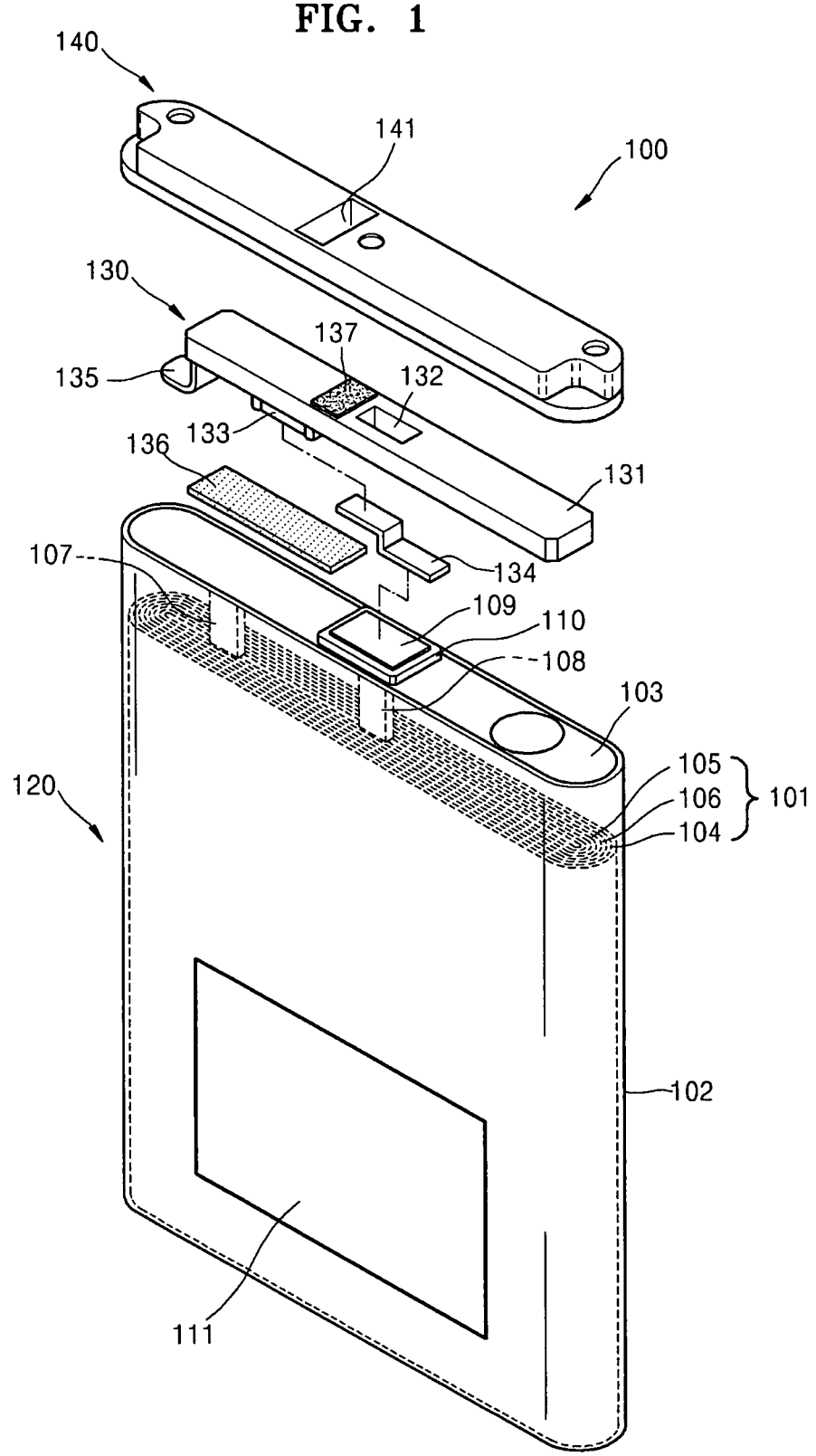
FIG. 1 illustrates an exploded perspective view of a secondary battery according to an embodiment of the present invention.
Figure 2:
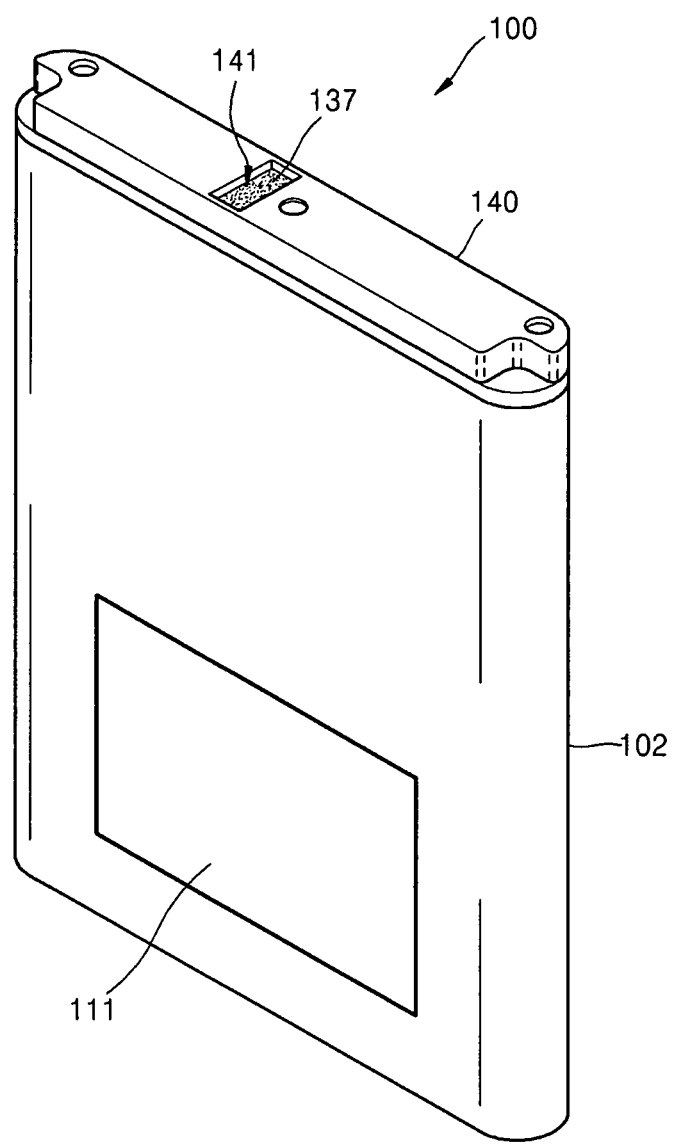
FIG. 2 illustrates a perspective view showing an assembled state of the secondary battery shown in FIG. 1.

FIG. 1 illustrates an exploded perspective view of a prismatic type secondary battery 100 according to an embodiment. FIG. 2 illustrates an assembled state of the prismatic type secondary battery 100 shown in FIG. 1.

Referring to FIGS. 1 and 2, the prismatic type secondary battery 100 may include a battery cell 120 which includes a can 102 which accommodates a battery unit 101 and a cap plate 103 which seals an opening of the can 102.

The battery unit 101 includes a positive electrode plate 104, a negative electrode plate 105, and a separator 106 disposed therebetween. The battery unit 101 may be a nickel-cobalt-manganese (Ni—Co—Mn) battery unit or a nickel-cobalt-aluminum (Ni—Co—Al) battery unit, but is not limited thereto, as long as the battery unit 101 has a low risk of explosion.

The positive electrode plate 104 may include a positive electrode collector made of a single strip of metal foil and a positive electrode coating portion coated on at least a surface of the positive electrode collector. The positive electrode coating portion may include a metal oxide as a main component thereof, a positive electrode binder, and a positive electrode conductive agent.

The positive electrode plate 104 is electrically connected to a positive electrode lead 107 via the positive electrode collector thereof. The positive electrode lead 107 protrudes upward from the can 102 and is electrically connected to the cap plate 103. The positive electrode lead 107 may be directly connected to the can 102.

The negative electrode plate 105 may include a negative electrode collector made of a single strip of metal foil and a negative electrode coating portion coated on at least a surface of the negative electrode collector. The negative electrode coating portion may include a metal oxide as a main component thereof, a negative electrode binder, and a negative electrode agent.

The negative electrode plate 105 is electrically connected to a negative electrode lead 108 via the negative electrode collector thereof. The negative electrode lead 108 protrudes upward from the can 102 and is electrically connected to a negative electrode terminal 109. A gasket 110 is fitted around the negative electrode terminal 109 to insulate the negative electrode terminal 109 from the cap plate 103.

The separator 106 may be made of a porous insulating material, e.g., polyethylene, polypropylene, or a combination thereof.

In a state in which the positive electrode plate 104, the separator 106, and the negative electrode plate 105 are stacked in this order, the battery unit 101 as a jelly-roll type may be formed by winding the positive electrode plate 104, the separator 106, and the negative electrode plate 105.

The battery unit 101 is inserted into the can 102. The can 102 is hollow, is made of a metal material, and has a shaped corresponding to the shape of the battery unit 101. The can 102 is formed of a conductive metal material, e.g., aluminum (Al), iron (Fe), or an alloy thereof. The can 102 may be manufactured by press molding, e.g., by deep drawing.

The opening of the can 102 is sealed by the cap plate 103. The can 102 itself may serve as a positive electrode terminal by being electrically connected to the positive electrode plate 105, the positive electrode lead 107, and the cap plate 103.

The positive electrode lead 107 and the negative electrode lead 108 protrude from the positive electrode plate 104 and the negative electrode plate 105, respectively, in such a way that the positive electrode lead 107 and the negative electrode lead 108 are upright in a space between the battery unit 101 and the cap plate 103. The positive electrode lead 107 is electrically connected to a bottom surface of the cap plate 103, and the negative electrode lead 108 is electrically connected to a bottom surface of the negative electrode terminal 109.

A protection circuit module (PCM) assembly 130 may be installed on top of the battery cell 120. The PCM assembly 130 may include a base circuit board 131 having an appropriate size as to be mounted on the cap plate 103. The base circuit board 131 may be a single-layer circuit board or multilayer-stacked circuit board where a circuit pattern layer or circuit pattern layers are formed, similar to a printed circuit board (PCB).

A laser hole 132 may be formed in the base circuit board 131 directly above the negative electrode terminal 109, e.g., at a center of the base circuit board 131. The laser hole 132 penetrates the base circuit board 131 in a thickness-wise direction of the base circuit board 131.

A plurality of electronic elements may be mounted on the base circuit board 131. The plurality of electronic elements may include a positive temperature coefficient (PTC) element 133, an integrated circuit (IC), a field effect transistor (FET), a resistor, a capacitor, and the like. The PTC element 133 may be mounted on a surface of the base circuit board 131 that faces the cap plate 103.

The PTC element 133 may be electrically connected to the negative electrode terminal 109 by a first connection lead 134. Alternatively, the PTC element 133 may be electrically connected to the negative electrode terminal 109 by a connection lead integrated with the PTC element 133, without having to separately provide or use the first connection lead 134. An insulating tape 136 on a top surface of the cap plate 103 may be attached to a portion of the cap plate 103 facing the PTC element 133.

A second connection lead 135 may be formed at a side of the base circuit board 131. The second connection lead 135 may be formed in such a way that an end portion thereof is bent and the bent portion is welded to the top surface of the cap plate 103. The second connection lead 135 has a positive polarity.

A negative output terminal 137, which is electrically connected to the PTC element 133, may be installed on a surface of the base circuit board 131 opposite to the surface facing the cap plate 103.

In the prismatic type secondary battery 100, the can 102 may serve as a positive output terminal. Thus, only the negative output terminal 137, and not a positive output terminal, may be formed in the PCM assembly 130. As such, the can 102 may be directly connected to a positive electrode terminal of an external device, for example, a charging device. The cap plate 103 may also be used as a positive output terminal. The negative output terminal 137 is directly connected to a negative electrode terminal of an external device, for example, a charging device.

That is, a positive output stage is formed by welding the cap plate 103 to the positive electrode lead 107 and by welding the can 102 to the cap plate 103, due to the positive electrode lead 107 protruding from the positive electrode plate 104.

A negative output stage is formed by connecting the PTC element 133 to the negative electrode lead 108 and by connecting the negative output terminal 137 to the PTC element 133, due to the negative electrode lead 109 protruding from the negative electrode plate 105.

A top case 140 is installed on top of the PCM assembly 130. The top case 140 is coupled to a top portion of the cap plate 103 while covering the PCM assembly 130. A negative output terminal hole 141 through which the negative output terminal 137 is exposed may be formed in the top case 140.

The top case 140 may be formed as a formed object made of polymer resin. The top case 140 may also be formed by injection-molding using a polymer resin to protect the PCM assembly 130 and a portion of the battery cell 102 which is coupled to the PCM assembly 130, but is not limited thereto.

A label 111 for allowing identification of information about the secondary battery 100 may be attached onto an outer surface of the can 102, or the information may be laser-processed thereon.

Figure 3:
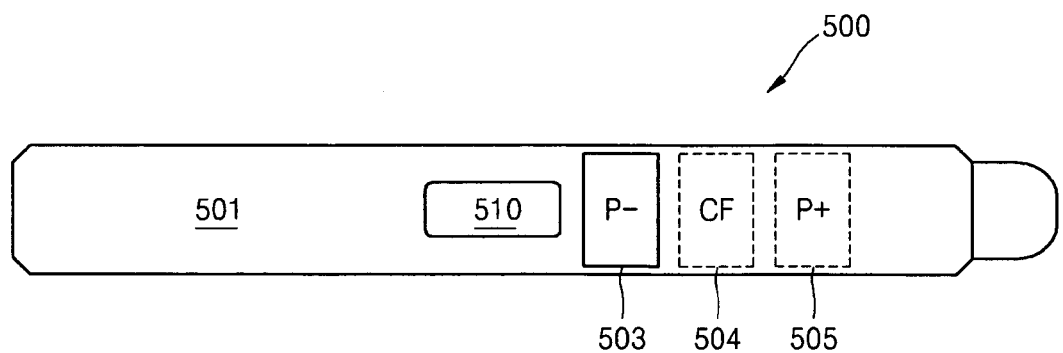
FIG. 3 illustrates a plan view showing a surface of a protection circuit module (PCM) assembly according to an embodiment of the present invention.
Figure 4:
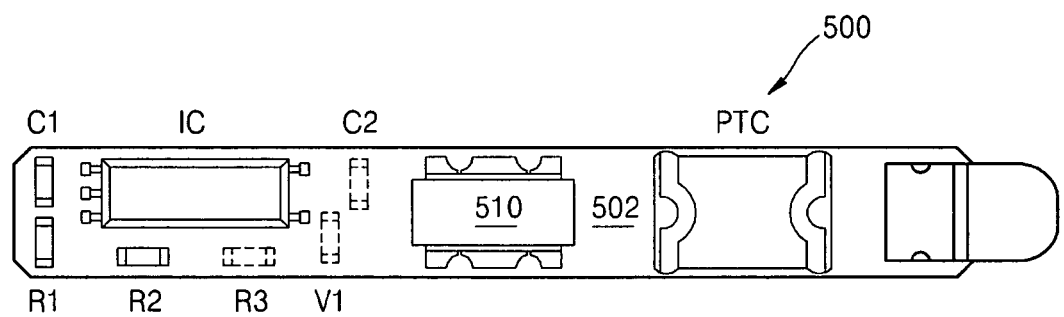
FIG. 4 illustrates a plan view showing another surface of the PCM assembly shown in FIG. 3.
Figure 5:
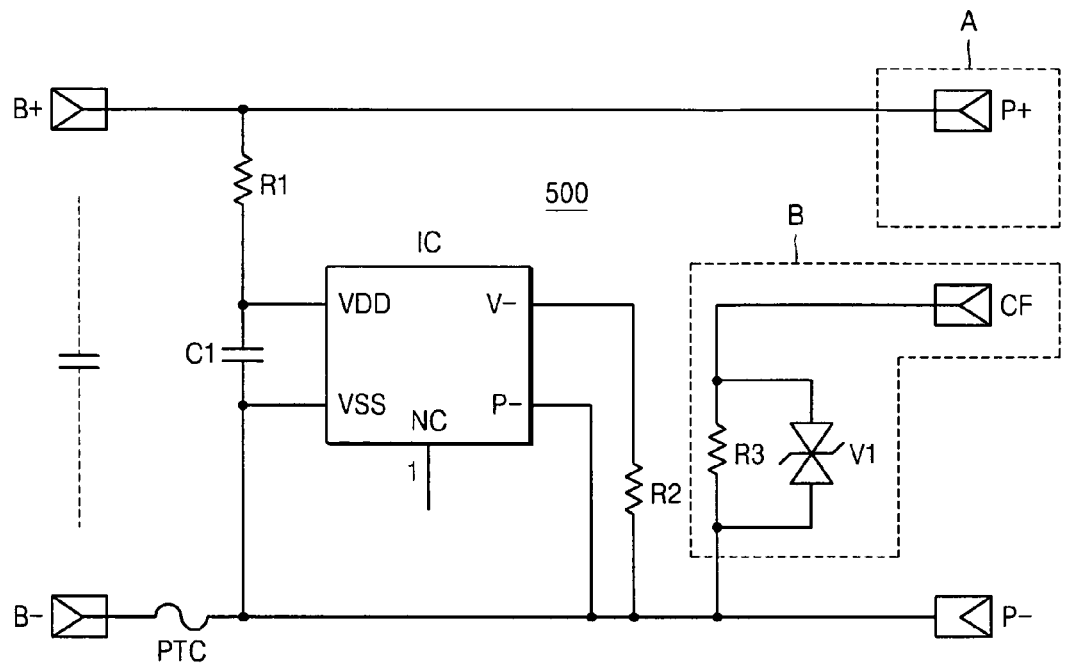
FIG. 5 illustrates a circuit diagram of the PCM assembly shown in FIG. 3.

FIG. 3 illustrates a plan view of a first surface 501 of a PCM assembly 500 according to an embodiment. FIG. 4 illustrates a plan view of a second surface 502 of the PCM assembly 500 shown in FIG. 3. FIG. 5 illustrates a circuit diagram of the PCM assembly 500 shown in FIG. 3.

Referring to FIGS. 3 through 5, a negative output terminal P−503 is formed on the first surface 501 of the PCM assembly 500. The negative output terminal 503 is electrically connected to a negative electrode plate of a battery unit as described above.

On the other hand, a positive output terminal P+ 505 and a resistance output terminal CF 504 are not formed on the surface 501 of the PCM assembly 500 as indicated by dotted lines. Instead, a can of a battery unit to which the PCM assembly 500 is to be connected may be used as a positive output terminal. A hole 510 may be provided through the PCM assembly to facilitate connections to the negative output terminal P− 503.

A plurality of electronic elements is mounted on the second surface 502 of the PCM assembly 500, i.e., a surface of the PCM assembly 500 that is to face a cap plate of a battery unit. A secondary battery according to an embodiment may be a nickel-cobalt-manganese (Ni—Co—Mn) secondary battery or a nickel-cobalt-aluminum (Ni—Co—Al) secondary battery, rather than a lithium battery, for safety reasons.

Consequently, unlike a lithium secondary battery, which has high safety risks, some elements of the plurality of electronic elements are not necessary, as indicated by dotted lines in FIGS. 3 through 5. In particular, in the conventional prismatic type secondary battery, an electronic element including a plurality of safety devices needs to be mounted in the PCM assembly to guarantee safety in the event that abnormalities of the battery occur, such as over-charge, over-discharge, over-current, and the like. However, when secondary batteries of types other than lithium secondary batteries, such safety devices may not be required.

In other words, an integrated circuit (IC) mounted on the second surface 502 of the PCM assembly 500 may be an IC by having no over-discharge function. Such an IC costs less than an IC having control over-charge, over-discharge, over-current, and short-circuit functions. To even further reduce costs, an IC may be replaced by a field effect transistor (FET).

When an FET is used, only a charge/discharge switching function is provided, e.g., an over-charge function may not be provided. A first resistor R1 and a first capacitor C1 for preventing damage to the IC and/or a second resistor R2 for protecting the IC in case of over-current and reverse charge may be used even when the IC is a FET. However, a second capacitor C2 for protecting the IC and/or a third resistor R3 and V1 for recognizing the capacity of the battery, may not be necessary when the IC is a FET.

FIG. 5 illustrates a schematic diagram of the PCM 500 and a positive output terminal (B+) and a negative output terminal (B−) of a battery to which the PCM 500 is to be connected. As mentioned above, since a battery can itself serves as the positive (B+) output terminal of a battery cell, a conventional positive output terminal P+ of a PCM assembly indicated by a dotted box A and a conventional resistance output terminal CF indicated by a dotted box B may not be provided in the PCM assembly 500.

The prismatic type secondary battery 100 structured as described above with reference to FIGS. 1 and 2 includes the battery unit 101, which may be a jelly-roll type battery that is manufactured by winding the positive electrode plate 104, the separator 106, and the negative electrode plate 105 stacked in this order.

The battery unit 101 is inserted into the can 102, after which the opening of the can 102 is sealed by the cap plate 103. In particular, coupled portions between the can 102 and the cap plate 103 may be welded together.

The positive electrode lead 107 protruding from the positive electrode plate 104 may be welded to the bottom surface of the cap plate 103 to stand upright. The negative electrode lead 108 protruding from the negative electrode plate 105 may be welded to the bottom surface of the negative electrode terminal 109 installed in the cap plate 103.

Next, the insulating tape 136 is attached to a surface of the cap plate 103 and the PCM assembly 130 (500) is placed on the battery cell 120. The insulating tape 136 is attached to the top surface of the cap plate 103, which faces the PTC element 133.

The first connection lead 134 connected to the PTC element 133 may be laser-welded to the negative electrode terminal 109 through the laser hole 132 formed in the base circuit board 131 by using a laser. The second connection lead 135 connected to a side of the base circuit board 131 may be resistance-welded to the cap plate 103.

The top case 140 is placed on top of the PCM assembly 130 (500) and the position of the negative output terminal 137 is arranged with respect to the negative output terminal hole 141, and then is coupled to the top case 140 and the PCM assembly 130, e.g., using an adhesive, thereby completing the secondary battery 100.

The PCM assembly and the prismatic type secondary battery using the same according to example embodiments provide one or more of the effects described below.

First, a first output stage having a first polarity is formed on the PCM assembly and a second output stage having a second polarity uses a can, thereby simplifying a structure of the secondary battery and reducing a manufacturing cost of the secondary battery.

Second, when a secondary battery other than a lithium secondary battery is used, an electronic element such as a low-price IC not using an over-discharge function or a FET can be mounted on the PCM assembly, thus reducing a manufacturing cost of the secondary battery.

Third, by using a secondary battery other than a lithium secondary battery, certain electronic elements, e.g., a resistor installed for safety, may not be needed, contributing to reduction of the manufacturing cost when eliminated.

Fourth, a bottom case, label for detecting water contact, or an outer case is not used, thereby reducing the manufacturing cost.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A prismatic type secondary battery, comprising:
    a battery cell including:
        a can accommodating a battery unit in which a first electrode plate, a separator, and a second electrode plate are wound,
        a cap plate sealing an opening of the can, and
        a first electrode lead and a second electrode lead electrically connected to and protruding from the first electrode plate and the second electrode plate, respectively; and
    a protection circuit module (PCM) assembly coupled to a cap plate of the battery cell and electrically connected to the first electrode lead and the second electrode lead, the PCM assembly including:
        a base circuit board;
        a plurality of electronic elements including a positive temperature coefficient (PTC) element mounted on the base circuit board and
        a first electrode output terminal on the base circuit board,
    wherein:
    a first output stage is formed by:
        a first end of the first electrode lead electrically connected to a first electrode terminal installed on the cap plate while being insulated from the cap plate,
        the first electrode lead electrically connected to the first electrode output terminal on the PCM assembly via the first electrode terminal, and
        the first electrode terminal to be electrically connected to a first terminal of an external device, and
    a second output stage is formed by:
        a first end of the second electrode lead electrically connected to the can or the cap plate, which is to serve as a second electrode output terminal, and
        the second electrode output terminal to be electrically connected to a second terminal of the external device, wherein
    a first connection lead electrically connects the PTC element and the first electrode output terminal, and
    a second connection lead electrically connected to the cap plate is installed in the PCM assembly.

2. The prismatic type secondary battery as claimed in claim 1, wherein the first electrode output terminal forms a negative output terminal.

3. The prismatic type secondary battery as claimed in claim 1, wherein the second electrode lead is electrically connected to a surface of the cap plate facing the battery unit.

4. The prismatic type secondary battery as claimed in claim 3, wherein the cap plate is welded to the can forming a positive output terminal.

5. The prismatic type secondary battery as claimed in claim 1, wherein:
    the first electrode output terminal forms a negative output terminal, and
    the cap plate is welded to the can so that the can forms a positive output terminal.

6. The prismatic type secondary battery as claimed in claim 1, further comprising a top case on top of the PCM assembly and coupled to the cap plate of the battery cell, the top case including a first electrode output terminal hole through which the first electrode output terminal is exposed.

7. The prismatic type secondary battery as claimed in claim 1, wherein:
    the plurality of electronic elements include a positive temperature coefficient (PTC) element disposed on a surface of the PCM assembly facing the cap plate, and
    an insulating tape is attached to a surface of the cap plate facing the PTC element.

8. The prismatic type secondary battery as claimed in claim 1, wherein a label is formed on an outer surface of the can.

9. The prismatic type secondary battery as claimed in claim 1, wherein the battery cell is a nickel-cobalt-manganese (Ni—Co—Mn) battery cell or a nickel-cobalt-aluminum (Ni—Co—Al) battery cell.

10. The prismatic type secondary battery as claimed in claim 1, wherein the first electrode output terminal on the base circuit board is the only electrode output terminal on the base circuit board.

11. A protection circuit module (PCM) assembly to be electrically connected to a battery cell for a secondary battery, the PCM assembly comprising:
    a base circuit board;
    a plurality of electronic elements including a positive temperature coefficient (PTC) element mounted on the base circuit board;
    a single electrode output terminal on the base circuit board, the single electrode output terminal to be electrically connected to a first terminal of an external device and to be electrically connected to an electrode terminal of the battery cell to form a first output stage;
    a first connection lead to electrically connect the PTC element and the electrode terminal; and
    a second connection lead at a side of the base circuit board, the second connection lead to be electrically connected to a cap plate or a case of the battery cell.

12. The PCM assembly as claimed in claim 11, further comprising a laser hole in the base circuit board, wherein the PTC element to be laser-welded to the electrode terminal through the laser hole.

* * * * *